United States Patent [19]

Nakamura

[11] Patent Number: 5,370,088
[45] Date of Patent: Dec. 6, 1994

[54] TWO CYCLE ENGINE

[75] Inventor: Mitsuyoshi Nakamura, Hamamatsu, Japan

[73] Assignee: Sanshin Kogyo Kabushiki Kaisha, Hamamatsu, Japan

[21] Appl. No.: 153,229

[22] Filed: Nov. 15, 1993

[30] Foreign Application Priority Data

Nov. 16, 1992 [JP] Japan .................. 4-330055

[51] Int. Cl.⁵ ............................. F02B 75/02
[52] U.S. Cl. ................ 123/65 V; 123/73 V; 137/856; 137/512.15
[58] Field of Search .............. 123/73 V, 65 V; 137/855, 856, 512.15

[56] References Cited

U.S. PATENT DOCUMENTS

| | | | |
|---|---|---|---|
| 4,228,770 | 10/1980 | Boyesen | 123/73 V |
| 4,235,206 | 11/1980 | Boyesen | 137/855 |
| 4,633,825 | 1/1987 | Flaig | 137/856 |
| 4,696,263 | 9/1987 | Boyesen | 123/73 V |
| 4,739,732 | 4/1988 | Nakamura | 123/73 V |
| 5,036,806 | 8/1991 | Rarick | 123/65 V |
| 5,243,934 | 9/1993 | Boyesen | 137/512.15 |
| 5,247,912 | 9/1993 | Boyesen et al. | 123/65 V |

*Primary Examiner*—Tony M. Argenbright
*Assistant Examiner*—M. Macy
*Attorney, Agent, or Firm*—Knobbe, Martens, Olson & Bear

[57] ABSTRACT

An improved reed valve arrangement for a two cycle engine wherein in addition to the normal reed valve elements and stopper plates, there are provided rectifier plates that define a flow passage so as to direct the charge away from the walls of the engine that define the associated intake passage.

9 Claims, 3 Drawing Sheets 5,370,088

TWO CYCLE ENGINE

BACKGROUND OF THE INVENTION

This invention relates to a two cycle engine and more particularly to an improved reed-type valve arrangement for such engines.

As is well known, crankcase compression two cycle internal combustion engines normally employ reed-type valves that are positioned in their intake ports and which extend into the intake passage that communicates with the crankcase chambers. These reed-type valves serve the purpose of permitting flow into the crankcase chamber but preclude reverse flow when the associated piston is compressing the charge in the crankcase chamber. It is a normal practice to have a stopper plate adjacent the valve element so as to limit its degree of movement in the opening direction. Obviously, it is important to correctly direct the flow of the intake charge into the crankcase chambers.

It is particularly desirable to ensure that the charge flowing through the reed-type valve be directed away from the sides of the intake passage. However, with most constructions this is not possible and a portion of the charge will actually flow along the walls that define the intake passage. This has the disadvantage that the fuel in the intake charge may condense on the walls of the intake passage and make the running of the engine irregular or rough.

Also, it is very difficult to form the intake passage in such a way that it will not interfere with the flow into the crankcase chambers. This is particularly true with modern fabrication techniques where many of the components of the engine such as the crankcase are formed as die castings. When cooling jackets and other factors are considered, the shape of the intake passage may be compromised and as a result the engine may not be as smooth running or as fuel efficient as desired.

It is, therefore, a principal object of this invention to provide an improved reed-type valve for controlling the flow into an intake passage of a two cycle crankcase compression engine.

It is a further object of this invention to provide a reed-type valve for the intake passage of a two cycle crankcase compression engine wherein the valve includes components that define in part the flow path of the charge into the crankcase chambers.

It is a still further object of this invention to provide an improved rectifier arrangement that can be employed with a reed-type valve so as to direct the flow into the crankcase chambers of a two cycle crankcase compression engine.

SUMMARY OF THE INVENTION

This invention is adapted to be embodied in a reed-type valve arrangement for a two cycle crankcase compression engine having an engine component defining an intake passage which defines an intake port opening through an outer surface of the engine component. A caging member is adapted to be affixed across the opening and extend into the intake passage. This caging member has a part which defines at least one flow opening. A reed valve element is affixed to the part for controlling the flow through the flow opening. A stopper plate is also carried by the caging member and is positioned to be engaged by the reed valve element and limit its degree of opening movement. A rectifier plate is carried by the caging member and serves the purpose of directing the flow from the flow opening into the intake passage.

DETAILED DESCRIPTION OF THE PREFERRED EMBODIMENT OF THE INVENTION

Figure 1:
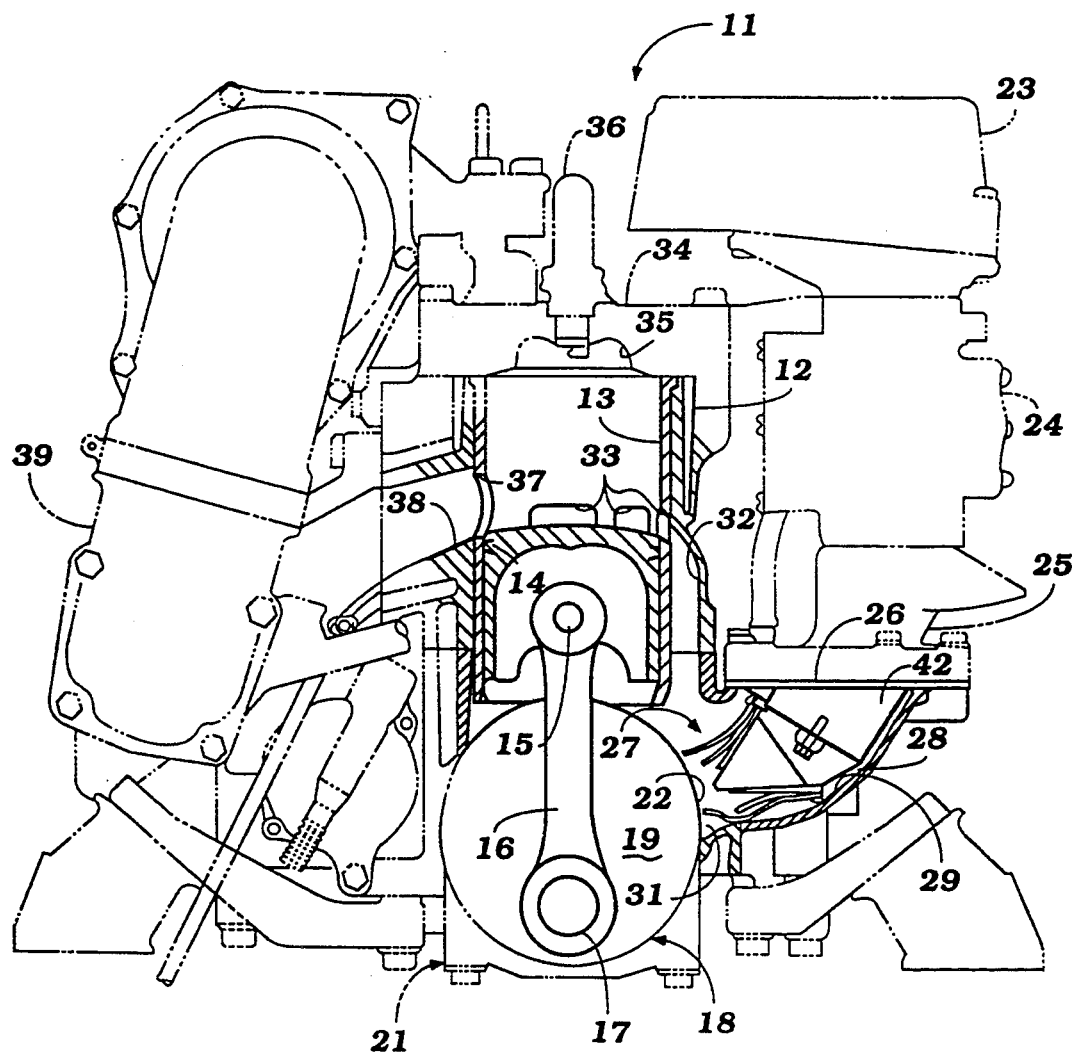
FIG. 1 is a side elevational view of the two cycle crankcase compression engine constructed and operating in accordance with an embodiment of the invention, with portions of the engine shown in phantom and a single cylinder of the engine shown in cross section.
Figure 2:
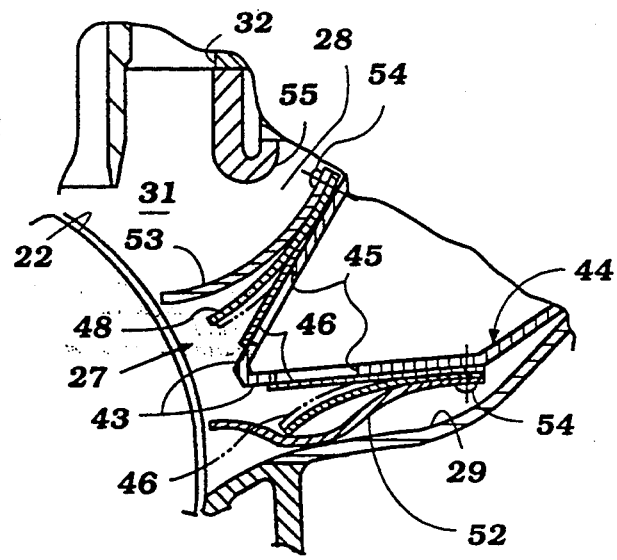
FIG. 2 is a further enlarged view showing the intake passage and crankcase chamber.

Referring first in detail to FIG. 1, a two cycle crankcase compression engine constructed in accordance with an embodiment of the invention is identified generally by the reference numeral 11. Since the invention deals with the intake system for the engine and specifically the flow controlling reed-type valve assembly, only this portion of the engine has been shown in cross section and the remaining components of the engine have been illustrated in phantom. Where any components are not described, they may be considered to be conventional.

The engine 11 is comprised of a cylinder block 12 which may be formed from a light alloy material such as aluminum or aluminum alloy and which may be formed by die casting. One or more cylinder bores are formed in the cylinder block 12 by cast or pressed-in cylinder liners 13. As noted, since the invention deals primarily with the induction system, only a single cylinder of the engine is depicted as those skilled in the art will readily understand how the invention is employed with multiple cylinder engines of any configuration.

A piston 14 is supported for reciprocation within the cylinder liner 13 and is connected by means of a piston pin 15 to a connecting rod 16. The lower or big end of the connecting rod 16 is journalled on a throw 17 of a crankshaft, indicated generally by the reference numeral 18. The crankshaft 18 is rotatably journalled within a crankcase chamber, indicated generally by the reference numeral 19 in any known manner. The crankcase chamber 19 is formed by a crankcase member 21 which also may be formed from a light alloy die casting and is affixed to the cylinder block 12 in any known manner. With multiple cylinder engines, the crankcase chambers 19 associated with each cylinder 13 will be sealed from each other in any well known manner. To this end, the crankshaft 18 is provided with a plurality of cylindrical sections 22 which are disposed closely adjacent the surface of the crankcase 21.

A fuel air charge is delivered to the crankcase chambers 19 by an induction system which is shown partially in phantom and which includes an air inlet device 23 into which atmospheric air is drawn. This air is then delivered to a charge former such as a carburetor 24 which creates a fuel air charge for delivery to an intake manifold 25. The intake manifold 25 is affixed to an upper surface 26 of the intake side of the crankcase member 21.

A reed-type valve assembly, indicated generally by the reference numeral 27 is affixed to this surface 26 beneath the intake manifold 25 and depends into an intake passage 28 that extends from an intake port formed in the surface 26 to the crankcase chamber 19. This intake passage 28 is defined in part by a curved lower wall 29 the shape of which cannot be as accurately controlled as desired. Thus, the reed-type valve assembly 27 is formed with a means to form the actual intake passage that serves the combustion chamber. The intake passage 28 has an enlarged opened end 31 that communicates with the crankcase chamber 19.

A charge which is drawn into the crankcase chamber 19 during the upward movement of the piston 14 will be compressed as the piston 14 moves downwardly. As is well known, the reed type valve assembly 27 will preclude reverse flow during this compression condition. The charge is then transferred to the area above the piston 14 through a plurality of scavenge passages 32 that extend from the crankcase chamber 19 and which terminate at scavenge ports 33 formed appropriately around the sides of the cylinder liner 13. The scavenge ports 33 are designed so as to provide the desired type of scavenging flow.

A cylinder head 34 is affixed to the upper end of the cylinder block 12 in a known manner and has a recess 35 that cooperates with the cylinder 13 and piston 14 so as to form the combustion chamber of the engine. The fuel air charge which is transferred to this combustion chamber through the scavenge ports 33 is fired by a spark plug 36 mounted in the cylinder head 34 in a known manner.

The burning charge expands and drives the piston 14 downwardly as is well known. One or more exhaust ports 37 are formed in the cylinder liner 13 and communicate with an exhaust passage 38 for discharge of the burnt gases to the atmosphere through an exhaust system, shown in phantom at 39.

Except for the construction of the reed-type valve assembly 27, the engine may be considered to be conventional. The reed-type valve assembly 27 will now be described by particular reference to the remaining figures. In the illustrated embodiment, the reed-type valve assembly 27 has a pair of portions which can serve adjacent cylinders or may serve side-by-side intake passages for the same crankcase chamber 19. It should be readily apparent to those skilled in the art that the valve assembly 27 may have any number of flow passages.

Figure 3:
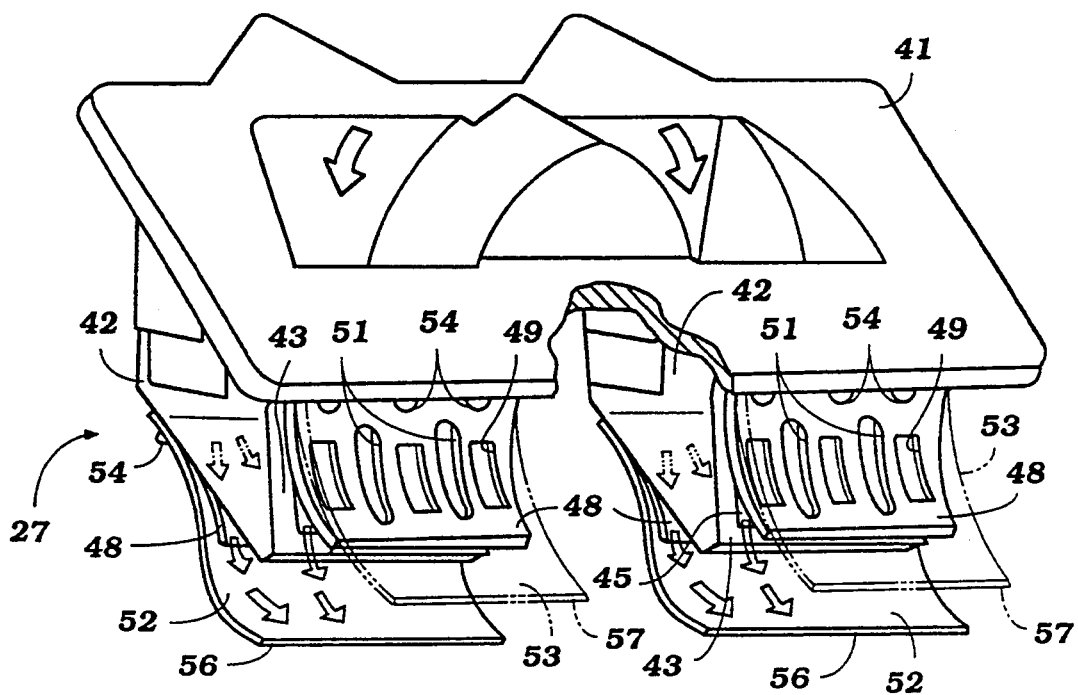
FIG. 3 is a perspective view of the reed-type valve assembly with portions shown in phantom and other portions broken away so as to more clearly show the construction.
Figure 4:
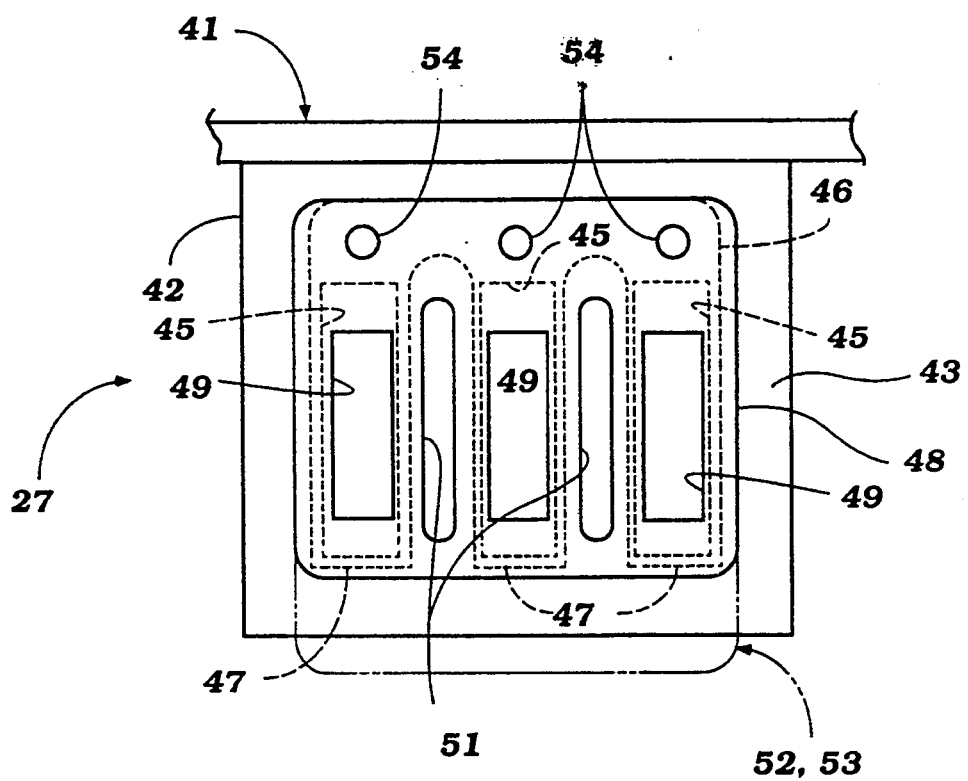
FIG. 4 is a view taken in the direction of the arrow 4 in FIG. 3 on an enlarged scale and with the rectifier plate shown in phantom lines.

The valve assembly 27 has a base plate portion 41 that is adapted to engage the surface 26 of the crankcase member 21 to which it is affixed. A pair of caging members, indicated generally by the reference numeral 42, extend downwardly from the base plate 41 and define respective flow paths from an opening in the base plate 41 as shown by the arrows in FIG. 3. The caging members 42 have pairs of angularly disposed surfaces 43 defined by walls 44. Three generally rectangular shaped flow openings 45 are formed in each of the walls 44. A reed-type valve element 46 is affixed to each surface 43, in a manner to be described, and has three individual finger portions 47 each of which cooperate with a respective one of the flow openings 45 to control the flow therethrough.

In order to limit the degree of flexure and opening of the reed valve fingers 45, each surface 43 also has affixed to it a stopper plate indicated generally by the reference numeral 48. Each stopper plate 48 has three rectangular openings 49 which are smaller than the flow openings 45 and a pair of interspersed generally oval openings 51 that are disposed between the fingers 47 but which are smaller in width than the gap between the fingers 47.

The construction as thus far described would, if the valve assembly 28 were conventional complete the construction of it. In accordance with the invention, however, there are provided a pair of rectifier plates 52 and 53 each associated with a respective one of the surfaces 43. The rectifier plate 52 and 53, stopper plate 48 and reed-type valve elements 46 are all affixed to the walls 44 of the caging members 42 by means of rivets, screws, or the like 54. It will be noted that the rectifier plate 52 and 53 extend further into the intake passage 28 than the caging member 42 and this is to provide a change in the effective shape of the intake passage 28 and for another purpose, as will be noted. The uppermost rectifier plate 53 has a generally arcuate curvature that lies below a lower peripheral edge 55 which separates the intake passage 28 from the scavenge passage 32 and provides a gradual flow divergence into the crankcase chamber 19.

The stopper plate 52, on the other hand, has a section that bows outwardly so as to clear the stopper plate 48 and then curves back inwardly so as to direct the intake charge away from the lower side wall 29 and more centrally into the crankcase chamber 19. As a result of this configuration, the shape of the actual intake passage 28 as formed in the crankcase number need not be so critical as with prior art construction. Of course, the actual shape of the rectifier plates 52 and 53 will depend upon the actual engine and desired flow pattern.

It should be noted that like a conventional engine not have the rectifier plate 52 and 53, fuel issuing from the openings 45 in the caging member will tend to impact upon the rectifier plates and some condensation may occur. However, unlike a conventional engine, the rectifier plate 52 and 53 have respective peripheral edges 56 and 57 which are spaced inwardly from the sides of the intake passage 28. As a result of this, any fuel which may condense on the surfaces of the rectifier plate 52 and 53 will be swept back into the airflow stream by the high velocity flow of air from these flow openings 45 and hence there will be not problem of accumulated fuel condensation that could cause irregular running or the like.

It is to be understood that the foregoing description is that of a preferred embodiment of the invention and that various changes and modifications may be made without departing from the spirit and scope of the invention, as defined by the appended claims.

I claim:

1. A reed valve arrangement for a two cycle engine having an engine component defining an intake passage which defines an intake port opening through an outer surface thereof, a caging member adapted to be affixed across said opening and extending into said intake passage, said caging member having a part defining a flow opening, a reed valve element affixed to said part for controlling the flow through said flow opening, a stopper plate carried by said caging member in position to be engaged by said reed valve element and limit its degree of opening, and a rectifier plate carried by said caging member for directing the flow from said flow opening into said passage in the desired direction.

2. The reed valve arrangement for a two cycle engine of claim 1, wherein the reed valve element, stopper plate and rectifier plate are all affixed to the caging member by the same fastener means.

3. The reed valve arrangement for a two cycle engine of claim 1, wherein the rectifier plate extends in the direction of flow beyond the stopper plate and the flow openings.

4. The reed valve arrangement for a two cycle engine of claim 3, wherein a rectifier plate terminates at a point spaced from the wall of the engine component defining the intake passage for directing the flow away from said wall.

5. The reed valve arrangement for a two cycle engine of claim 1, wherein the caging member has a pair of angularly related parts defining flow openings and further includes a reed valve element, stopper plate, and rectifier plate associated with each of said parts.

6. The reed valve arrangement for a two cycle engine of claim 5, wherein the reed valve elements, stopper plates and rectifier plates are all affixed to the caging member by the same fastener means.

7. The reed valve arrangement for a two cycle engine of claim 5, wherein the rectifier plates extend in the direction of flow beyond the respective stopper plate and the flow openings.

8. The reed valve arrangement for a two cycle engine of claim 7, wherein rectifier plates terminate at points spaced from the wall of the engine component defining the intake passage for directing the flow away from said wall.

9. The reed valve arrangement for a two cycle engine of claim 8, wherein the reed valve elements, stopper plates and rectifier plates are all affixed to the caging member by the same fastener means.

* * * * *